US009658920B1

(12) United States Patent
Hew

(10) Patent No.: US 9,658,920 B1
(45) Date of Patent: May 23, 2017

(54) METHOD FOR RECONFIGURING AN ERRONEOUS MEMORY FRAME IN AN INTEGRATED CIRCUIT

(71) Applicant: Altera Corporation, San Jose, CA (US)

(72) Inventor: Yin Chong Hew, Selama (MY)

(73) Assignee: Altera Corporation, San Jose, CA (US)

(*) Notice: Subject to any disclaimer, the term of this patent is extended or adjusted under 35 U.S.C. 154(b) by 248 days.

(21) Appl. No.: 13/924,374

(22) Filed: Jun. 21, 2013

(51) Int. Cl.
*G06F 11/08* (2006.01)
*G06F 11/00* (2006.01)

(52) U.S. Cl.
CPC .................................... *G06F 11/08* (2013.01)

(58) Field of Classification Search
None
See application file for complete search history.

(56) References Cited

U.S. PATENT DOCUMENTS

| 5,938,764 | A  | * | 8/1999  | Klein ................................. 713/1 |
| 7,275,129 | B1 | * | 9/2007  | Phung ................. G06F 13/1663 711/105 |
| 7,430,703 | B1 | * | 9/2008  | Schultz .......................... 714/773 |
| 7,539,926 | B1 | * | 5/2009  | Lesea ............................. 714/776 |
| 7,559,011 | B1 | * | 7/2009  | Edwards ........................ 714/811 |
| 7,576,557 | B1 | * | 8/2009  | Tseng ............... H03K 19/17752 326/14 |
| 7,620,876 | B2 | * | 11/2009 | Lewis et al. .................. 714/763 |
| 7,634,713 | B1 | * | 12/2009 | Ngo .............................. 714/781 |
| 7,844,886 | B1 | * | 11/2010 | Ngo .............................. 714/785 |
| 8,341,469 | B2 | * | 12/2012 | Miyama et al. .............. 714/719 |
| 8,560,927 | B1 | * | 10/2013 | Pagiamtzis et al. .......... 714/785 |

FOREIGN PATENT DOCUMENTS

| EP | 0834125 | 2/2002 |
| EP | 0793174 | 5/2003 |
| EP | 1000395 | 12/2004 |
| WO | 9106068 | 5/1991 |

OTHER PUBLICATIONS

Le, "Soft Error Mitigation Using Prioritized Essential Bits", XAPP538 (v1.0), Xilinx Inc., Apr. 4, 2012.

* cited by examiner

*Primary Examiner* — Justin R Knapp

(57) ABSTRACT

A method of correcting a configuration memory frame may include identifying an erroneous memory frame in a plurality of memory frames in the integrated circuit. The erroneous memory frame may be identified with error detection circuitry on the integrated circuit. A portion of data stored in an off-chip memory module may be read with controller circuitry. The read data portion may correspond to the erroneous memory frame. The erroneous memory frame may thus be corrected by loading the read data portion into the erroneous memory frame during normal operation of the integrated circuit. Every memory bit in the erroneous memory frame may be replaced or overwritten when the read data portion is loaded into the erroneous memory frame. The integrated circuit may be partially reconfigured when the erroneous memory frame is corrected.

18 Claims, 6 Drawing Sheets

METHOD FOR RECONFIGURING AN ERRONEOUS MEMORY FRAME IN AN INTEGRATED CIRCUIT

BACKGROUND

Integrated circuit devices may generally be adapted to implement a wide array of functions. Programmable integrated circuit devices such as field programmable logic array (FPGA) devices may include configurable memory elements that may be used to implement different user designs. In general, such memory elements may be configured multiple times.

As an example, configuration random access memory (CRAM) bits in a programmable logic device may be overwritten when the device is being reconfigured. However, CRAM bits may be susceptible to single event upset (SEU) errors or unwanted changes. For instance, CRAM bits may be sensitive to external elements, such as radiation, that may inadvertently cause the affected CRAM bits to be corrupted.

In general, an integrated circuit device may include error detection circuitry that may be used to detect erroneous CRAM bits (e.g., CRAM bits that have been wrongly changed due to SEU errors). Often times, in order to correct any configuration error, the entire integrated circuit device (or more specifically, the configuration memory elements on the integrated circuit device) may need to be reconfigured.

Even though CRAM errors may be corrected by reconfiguring the device, reconfiguring the whole integrated circuit device is generally costly and time consuming as the device (and subsequently any system that the device may be used in) may need to remain inactive until it is fully reconfigured.

It is within this context that the embodiments described herein arise.

SUMMARY

Circuitry and techniques for detecting and correcting errors in configuration memory frames on an integrated circuit are provided. It is appreciated that the present invention can be implemented in numerous ways, such as a process, an apparatus, a system, or a device. Several inventive embodiments of the present invention are described below.

A method of correcting a configuration memory frame in an integrated circuit with multiple configuration memory frames may include identifying an erroneous memory frame. The erroneous memory frame may be identified with error detection circuitry on the integrated circuit. In one embodiment, the error detection circuitry may generate an error message that includes the frame address of the erroneous memory frame. A portion of data stored in an off-chip memory module is read with controller circuitry. As an example, the portion of data may be read based on the frame address in the error message generated by the error detection circuitry. The read data portion may correspond to the erroneous memory frame such that the erroneous memory frame may be corrected by loading the read data portion into the erroneous memory frame during normal operation of the integrated circuit.

A method of operating an integrated circuit may include generating an error message with error detection circuitry when an error is detected in at least one memory frame in the integrated circuit. The integrated circuit may include a memory element with multiple memory frames. The error message generated by the error detection circuitry may include the frame address of the erroneous memory frame. The integrated circuit may be coupled to an external memory module. Memory content may be read from a selected memory frame in the external memory module based on the identified frame address. The integrated circuit may then be configured with the memory content that has been read form the selected memory frame in the memory module. In one embodiment, only affected memory frames (or erroneous memory frames) in the integrated circuit are configured while unaffected memory frames (or error-free memory frames) in the integrated circuit remain unchanged.

An integrated circuit may include an on-chip memory with multiple memory frames. The integrated circuit may include error detection circuitry that checks the memory frames in the on-chip memory for errors. When an error is detected in an erroneous memory frame, the error detection circuitry may generate an error message. The integrated circuit may further include controller circuitry that receives the error message from the error detection circuitry and reads data from a selected memory frame in an off-chip memory module based on the error message received. Control block on the integrated circuit may update content of the erroneous memory frame based on data read from the selected memory frame in the off-chip memory module.

DETAILED DESCRIPTION

The embodiments provided herein include circuitry and techniques to correct erroneous memory frames in a memory element on an integrated circuit (IC). The IC may be partially reconfigured to correct the erroneous memory frame.

It will be obvious to one skilled in the art that the present exemplary embodiments may be practiced without some or all of these specific details. In other instances, well-known operations have not been described in detail in order not to unnecessarily obscure the present embodiments.

An IC device such as a field-programmable gate array (FPGA) device may generally be reconfigured when the need arises. For instance, an IC device may be configured (or reconfigured) when a new user design is loaded onto the IC device. Often times, an IC device may also be partially reconfigured when a user design that has been loaded onto the IC is updated. As such, a programmable IC device generally includes memory elements that may be used to store configuration information that may be used to program the device.

Figure 1:
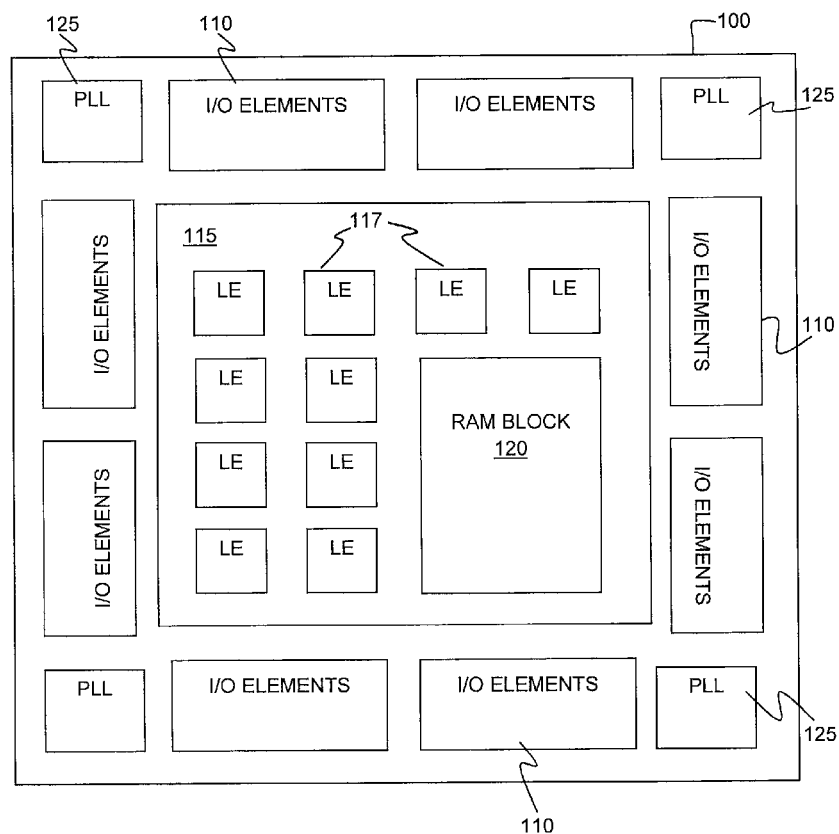
FIG. 1 is a block diagram of an illustrative integrated circuit in accordance with one embodiment of the present invention.

FIG. 1, meant to be illustrative and not limiting, shows a block diagram of IC 100 that can implement embodiments of the present invention. Generally, an IC device such as IC 100 includes core logic region 115 and input-output elements 110. Other auxiliary circuits, such as phase-locked loops (PLLs) 125 for clock generation and timing, can be located outside the core logic region 115 (e.g., at corners of IC 100 and adjacent to input-output elements 110).

Signals may be sent from core logic region 115 and other relevant logic blocks of IC 100 to other external circuitry or components that may be connected to IC 100 through input-output elements 110. A single device like IC 100 can potentially support a variety of different interfaces and each individual input-output bank 110 can support a different input-output standard with a different interface or protocol (e.g., high-speed serial interface protocol).

Signals received from external circuitry at input-output elements 110 may be routed from input-output elements 110 to core logic region 115 and other logic blocks on IC 100. Core logic region 115 and other logic blocks on IC 100 may perform functions based on the signals received.

Core logic region 115 may be populated with logic cells that include "logic elements" (LEs) 117, among other circuits. LEs 117 may include look-up table-based logic regions and may be grouped into "Logic Array Blocks" (LABs). LEs 117 and groups of LEs or LABs can be configured to perform logical functions desired by the user. Configuration data loaded into configuration memory elements such as random access memory (RAM) block 120 may be used to produce control signals that configure LEs 117 and groups of LEs and LABs to perform the desired logical functions.

Figure 2A:
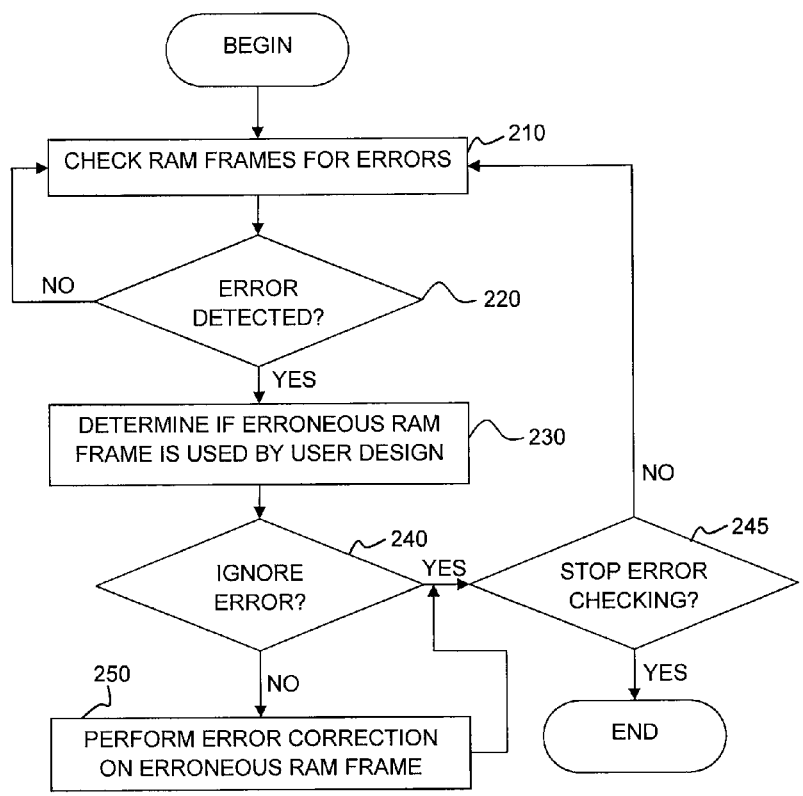
FIG. 2A shows an illustrative method for detecting and correcting errors in memory frames on an integrated circuit as one embodiment in accordance with the present invention.

FIG. 2A shows an illustrative method for detecting and correcting errors in memory frames on an IC (such as IC 100 of FIG. 1) as one embodiment in accordance with the present invention. The IC may include a RAM element with multiple RAM frames loaded with configuration data. For instance, the IC may be loaded with a specific user design. At step 210, the RAM frames are checked for errors. In one embodiment, the IC may include error detection circuitry that is configured to periodically check all, or at least portions, of the RAM frames for unwanted errors (e.g., the error detection circuitry may detect SEU errors on any of the RAM frames). As an example, a cyclic redundancy check (CRC) value may be embedded in each RAM frame. To check for errors in a particular RAM frame, a real-time CRC value for that particular RAM frame may be calculated and compared against its embedded CRC value. If both the CRC values do not match, then the RAM frame may be flagged as an erroneous frame. If no error is detected at step 220, the method may return to step 210.

When an error is detected at step 220, the erroneous frame may be identified. For instance, the error detection circuitry may obtain the frame address of the erroneous frame when it detects an error in the memory frame. At step 230, it is determined whether the erroneous RAM frame is used by the particular user design loaded in the IC. In one embodiment, the RAM frames may include sensitive and insensitive RAM frames. As such, the error may be ignored at step 240 if the erroneous RAM frame is an insensitive RAM frame (e.g., when the RAM frame is not part of the user design). If the erroneous RAM frame is a sensitive RAM frame that is associated with the user design (i.e., used by that particular design), the erroneous RAM frame needs to be updated or reconfigured with the correct data. If the error detection circuitry (or control circuitry or a user) chooses to ignore the error, the error checking operation may be stopped or restarted at step 245.

If the error is not ignored at step 240, then an error correction operation may be performed on the erroneous RAM frame at step 250. In one embodiment, configuration data for that particular RAM frame may be read from an external memory module (i.e., an off-chip memory module) and the erroneous RAM frame is corrected by loading the data read from the external memory module to the erroneous RAM frame.

Figure 2B:
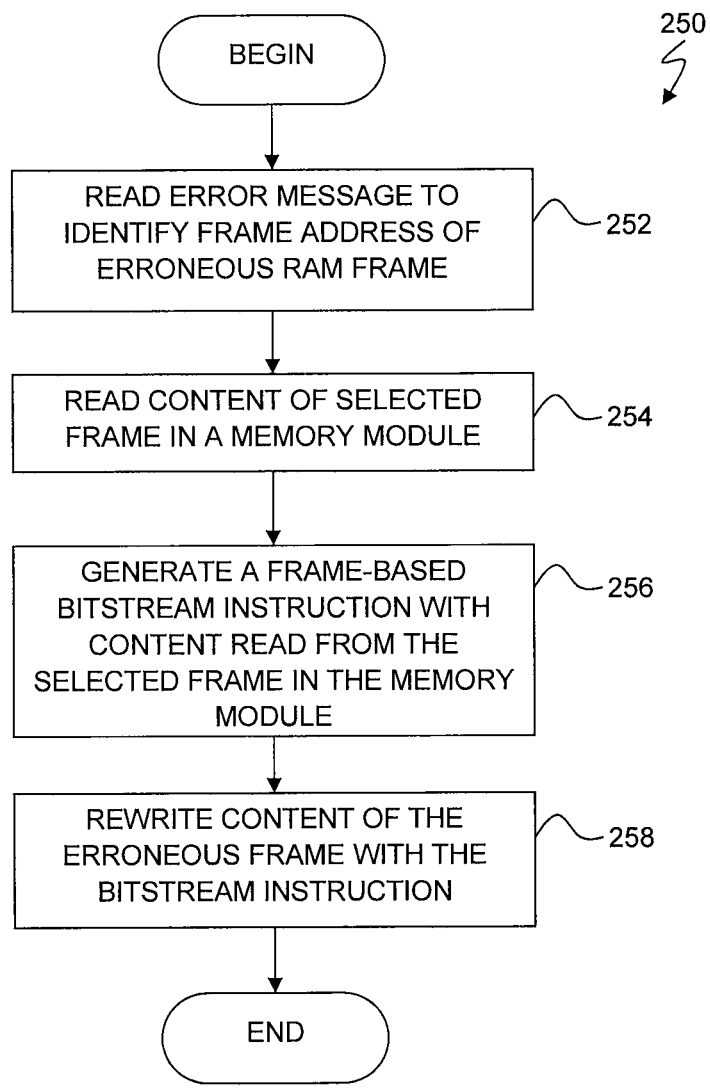
FIG. 2B shows an illustrative method for performing an error correction operation on an erroneous random access memory (RAM) frame in accordance with one embodiment of the present invention.

FIG. 2B shows illustrative method 250 for performing error correction on an erroneous RAM frame in accordance with one embodiment of the present invention. At step 252, an error message may be read to identify the frame address of the erroneous RAM frame. As mentioned above with reference to FIG. 1, error detection circuitry on the IC may obtain the frame address of the erroneous RAM frame when it detects an error. In one embodiment, the error detection circuitry on the IC may generate an error message that includes the frame address of the erroneous RAM frame.

At step 254, the content of a selected memory frame in an external memory module is read with controller circuitry (the details of which will be explained in subsequent paragraphs with reference to FIGS. 4-6). For instance, the external memory module may have configuration memory frames arranged in rows that correspond to respective rows of RAM frames on the IC (e.g., the rows of configuration memory frames in the external memory module and the rows of RAM frames on the IC may share similar frame addresses). As such, the selected memory frame in the external memory module may be determined based on the frame address in the error message.

At step 256, a frame-based bitstream instruction may be generated with the content read from the selected memory frame in the external memory module. As an example, controller circuitry (either an internal circuitry on the IC or coupled externally to the IC), may generate the bitstream instruction to reconfigure the erroneous memory frame with data read from the selected memory frame in the external memory module. At step 258, the content of the erroneous frame is rewritten (or reconfigured) with the bitstream instruction. In one embodiment, the erroneous RAM frame may be reconfigured during normal operation of the IC while other RAM frames in the IC may remain unchanged.

Figure 3A:
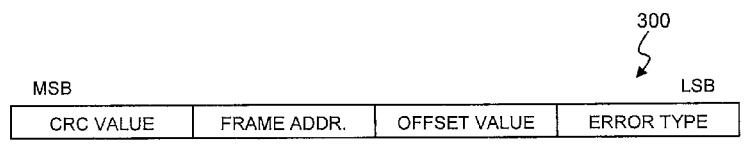
FIG. 3A depicts an illustrative structure of an error message in accordance with one embodiment of the present invention.

FIG. 3A depicts an illustrative structure of error message 300 in accordance with one embodiment of the present invention. Error message 300 may be generated by error detection circuitry on an IC similar to IC 100 of FIG. 1. Different types of information may also be captured in an error message such as error message 300. In the embodiment of FIG. 3A, different bits may be used to represent, among others, the type of error, an offset value, the frame address of the particular error frame, and a cyclic redundancy check (CRC) value.

In one embodiment, four least significant bits (LSBs) in error message 300, ERROR TYPE, may be used to record the type of error detected. For instance, different bit combinations may be used to indicate whether the detected error is a single-bit error or a double adjacent-bit error. OFFSET VALUE in error frame 300 may be used to indicate the bit or byte offset adjustment needed (details of which are omitted in order not to obscure the present invention).

It should be appreciated that error detection circuitry in an IC device may compute a CRC value or perform a CRC operation based on the content of (or at least a portion of) the RAM frames. In one embodiment, CRC VALUE in error message 300 may be a 32-bit value. Error message 300 may record the frame address, FRAME ADDR., of the erroneous frame. The frame address, FRAME ADDR., may be identified at step 252 of FIG. 2B and may subsequently be used to read from the external memory module as explained above with reference to FIG. 2B.

Figure 3B:
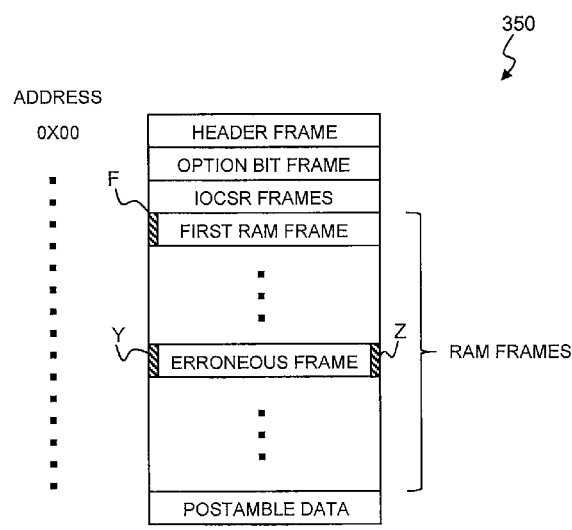
FIG. 3B depicts an illustrative memory element in accordance with one embodiment of the present invention.

FIG. 3B depicts illustrative memory element 350 in accordance with one embodiment of the present invention. Memory element 350 may be a RAM element on an IC device similar to RAM block 120 of FIG. 1. Memory element 350 includes multiple frames such as HEADER FRAME, OPTION BIT FRAME, IOCSR FRAMES, RAM FRAMES and POSTAMBLE DATA. Each of the memory frames in memory element 350 may have a frame address. In one embodiment, HEADER FRAME may be used to store header information such as address mapping information and a predetermined bit pattern to indicate the start of the memory element. Accordingly, POSTAMBLE DATA may represent padding bits that are used as buffer when the end memory element 350 is reached.

In one embodiment, IOCSR FRAMES may be frames used to store configuration information for input-output elements (or other actual circuit elements) on the IC device while OPTION BIT FRAME may store user defined configuration options. As an example, these options may include, among others, the configuration scheme, configuration clock speed, decompression (if needed), and configuration page settings. It should be appreciated that specific details of POSTAMBLE DATA, OPTION BIT FRAME and IOCSR FRAMES in memory element 350 are not described in detail in order not to unnecessarily obscure the present invention. Configuration information may be stored in RAM FRAMES in memory element 350. A specific RAM FRAME may be reconfigurable without affecting other RAM FRAMES. For instance, if an ERRONEOUS FRAME is detected in one of the RAM FRAMES, that specific RAM frame may be reconfigured without affecting other RAM FRAMES.

In one embodiment, the address of the ERRONEOUS FRAME may be recorded in an error message generated by error detection circuitry on the IC device. Each bit in the ERRONEOUS FRAME may be replaced or rewritten with content read from another memory module. In order to replace the content of a single RAM FRAME without affecting other frames in memory element 350, actual bit addresses of the first and last bits of that particular frame may be needed.

Accordingly, the respective addresses of the first (or leading) bit and the last bit of the ERRONEOUS FRAME may be calculated using the address of the first memory bit of the FIRST RAM FRAME of the multiple RAM FRAMES.

As an example, the address of the first bit of the desired frame, Y, may be calculated by the following formula: $Y=F+(E*S)$, where F is the address of the first memory bit of the FIRST RAM FRAME, S is the size of a single RAM FRAME and E is the frame address obtained from an error message such as error message 300 of FIG. 3A. In one embodiment, the values of F and S are known constants that are stored in a controller circuit that communicates with the memory element. The address of the last bit of the desired frame, Z, may be calculated based on the calculated address of its first bit, Y. In one embodiment, Z may be obtained from the following formula: $Z=Y+S$.

Figure 3C:
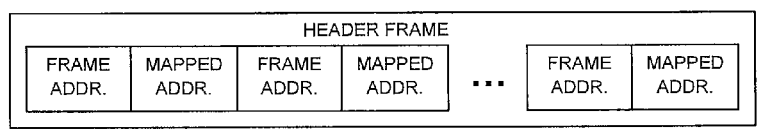
FIG. 3C shows illustrative mapping information stored in a header frame of a memory element in accordance with one embodiment of the present invention.

In various instances, RAM FRAMES in memory element 350 may be encrypted or compressed. When the RAM FRAMES are encrypted (or compressed) the HEADER FRAME may store mapping information to map the frame address read from an error message to the actual frame address of an encrypted frame in the memory element. FIG. 3C shows illustrative mapping information stored in the HEADER FRAME in accordance with one embodiment of the present invention. Each frame address, FRAME ADDR., may be mapped to a corresponding address, MAPPED ADDR. Therefore, in one embodiment, the HEADER FRAME may store pairs of frame addresses, where each pair of frame addresses includes a frame address and a mapped address as that shown in FIG. 3C. In such instances, the controller circuitry that communicates with the memory element may read the mapping information in the HEADER FRAME to find the mapped frame address based on the frame address read from the error message produced by the error detection circuitry.

Figure 4:
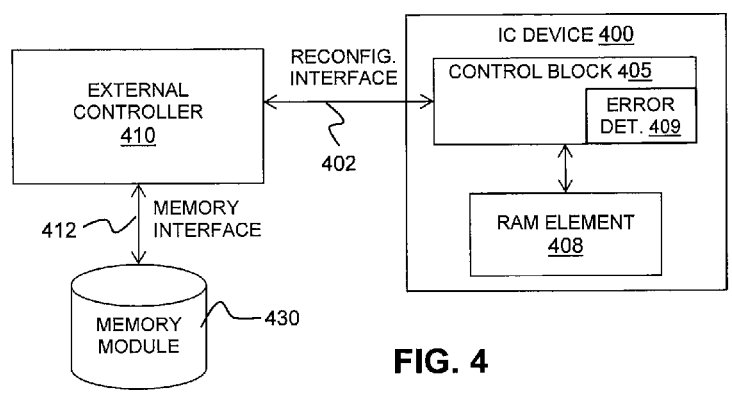
FIG. 4 shows an illustrative block diagram of an integrated circuit device coupled to an external memory module through an external controller in accordance with one embodiment of the present invention.

FIG. 4 shows illustrative block diagram of IC device 400 coupled to external memory module 430 through external controller 410 in accordance with one embodiment of the present invention. IC device 400 may include control block 405, error detection circuitry 409 and RAM element 408. As shown in FIG. 4, control block 405 may be used as an interface that allows communication between RAM element 408 and external controller 410. On-chip memory module RAM element 408 may be used to store configuration data used to configure IC device 400. In one embodiment, the structure of RAM element 408 may be similar to memory element 350 of FIG. 3B.

In the embodiment of FIG. 4, control block 405 may include error detection circuitry 409 that is used to constantly check configuration memory frames in RAM element 408 for errors. Error detection circuitry 409 may accordingly generate an error message similar to error message 300 of FIG. 3A when an erroneous memory frame is detected in RAM element 408. External controller 410 may be a memory controller that is implemented on another IC device such as a complex programmable logic device (CPLD) that is coupled to IC device 400. External controller 410 may be coupled to IC device 400 (or more specifically control block 405 on IC device 400) through reconfiguration interface 402 and may be coupled to external memory module 430 through memory interface 412. Accordingly, external controller 410 may communicate with both IC device 400 and external memory module 430 that may be used to store configuration information for IC device 400.

As an example, control block 405 may transmit the error message generated by error detection circuitry 409 to external controller 410. Based on the received error message (or rather, the frame address read from the received error message), external controller 410 may then read data from a selected memory frame in external memory module 430.

External controller 410 may then transmit the data read from the selected memory frame in external memory module 430 back to control block 405. Accordingly, control block 405 may update the content of the erroneous memory frame based on the data received from external controller 410. In one embodiment, control block 405 may reconfigure specific memory frames without affecting other memory frames in RAM element 408 during normal operation of IC device 400.

Figure 5:
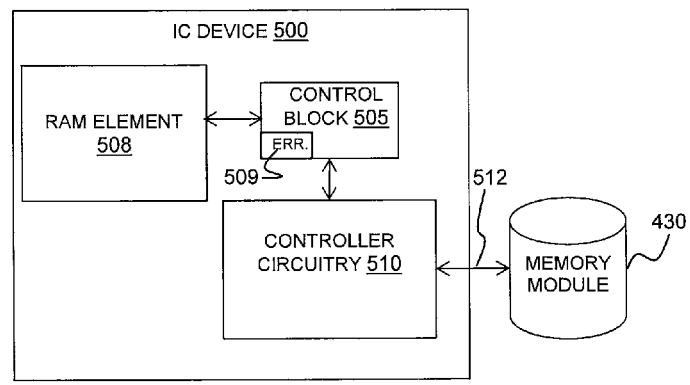
FIG. 5 depicts an illustrative integrated circuit device with controller circuitry that is used to reconfigure a memory element in accordance with one embodiment of the present invention.

FIG. 5 depicts illustrative IC device 500 with controller circuitry 510 that is used to reconfigure RAM element 508 in accordance with one embodiment of the present invention. RAM element 508 and control block 505 (together with error detection circuitry 509) may be similar, respectively, to RAM element 408 and control block 405 of FIG. 4. As such, for the sake of brevity, specific details of control block 505 and RAM element 508 are not repeated here. In the embodiment of FIG. 5, controller circuitry 510 may be an on-chip circuit that is coupled to control block 505. As an example, controller circuitry 510 may be a hard circuit block that is located at the peripheral region of IC device 500. As another example, when IC device 500 is a system-on-chip device, controller circuitry 510 may be implemented as a software block running on processor circuitry on IC device 500.

Controller circuitry 510 communicates with external memory module 430 through input-output interface 512 and may thus be located at the peripheral region of IC device 500. In one embodiment, input-output interface 512 may be a memory protocol interface. Error detection circuitry 509 may detect an erroneous memory frame in RAM element 508 and depending on the erroneous memory frame detected (e.g., error detection circuitry 509 may further determine whether or not the erroneous memory frame contains configuration data used in the user design that is loaded onto IC device 500), control block 505 may communicate the frame address of the erroneous memory frame to controller circuitry 510. Accordingly, controller circuitry 510 may read from a corresponding memory frame in external memory module 430 based on the frame address received from control block 505. In one embodiment, controller circuitry 510 may perform all or at least some of the steps depicted in FIG. 2B.

Figure 6:
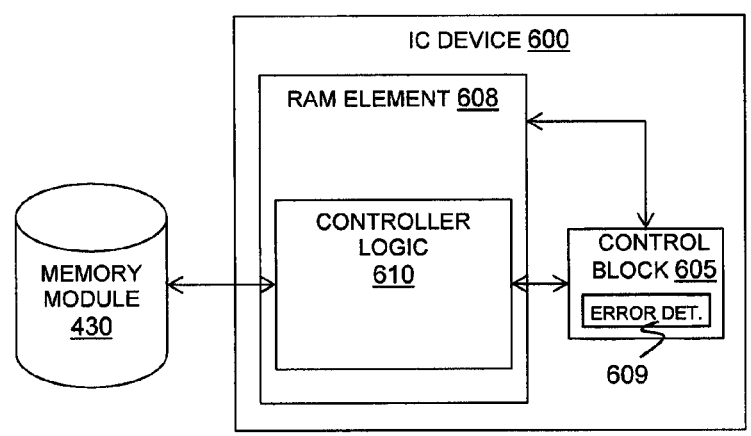
FIG. 6 shows an illustrative integrated circuit device with controller logic implemented within a memory element in accordance with one embodiment of the present invention.

FIG. 6 shows illustrative IC device 600 with controller logic 610 implemented within RAM element 608 in accordance with one embodiment of the present invention. RAM element 608 may be coupled to control block 605 and controller logic 610 may be coupled to external memory module 430. Error detection circuitry 609 within control block 605 may perform an error checking operation similar to that shown in FIG. 2A on RAM element 608. When an erroneous memory frame is detected in RAM element 608, control block 605 may transmit an error message generated by error detection circuitry 609 to controller logic 610. Accordingly, controller logic 610 may read content from a corresponding memory frame in external memory module 430 based on the error message generated by error detection circuitry 609.

Controller logic 610 may then generate a bitstream instruction to reconfigure the erroneous memory frame in RAM element 608. The reconfiguration instruction may be transmitted from controller logic 610 to the erroneous memory frame through control block 605. As controller logic 610 is a soft logic block that is implemented in RAM element 608, controller logic 610 may itself be susceptible to SEU errors that affect RAM element 608. Accordingly, in one embodiment, there may be multiple controller logic blocks similar to controller logic 610 that exist as soft logic blocks within RAM element 608. Having multiple instances of controller logic blocks within RAM element 608 may ward off unwanted errors that may affect the functionality of the controller logic. For instance, there may be three controller logic blocks similar to controller logic 610 within RAM element 608 and the outputs from all the controller logic blocks, such as the generated bitstream instruction and the content read from the corresponding memory in external memory module 430, may be checked against each other for consistency.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The foregoing is merely illustrative of the principles of this invention and various modifications can be made by those skilled in the art without departing from the scope and spirit of the invention.

What is claimed is:

1. A method of correcting a configuration memory frame in an integrated circuit with a plurality of configuration memory frames, comprising:
   with error detection circuitry on the integrated circuit, identifying an erroneous memory frame in the plurality of configuration memory frames;
   reading a portion of data stored in an off-chip memory module with controller circuitry, wherein the read data portion corresponds to the erroneous memory frame;
   generating an error message with the error detection circuitry, wherein the error message comprises a frame address of the erroneous memory frame, and wherein the read data portion is read from the off-chip memory module based on the frame address;
   with the controller circuitry, determining an address of a leading memory bit in the erroneous memory frame based on at least the frame address, a size of a single configuration memory frame in the plurality of configuration memory frames, and an address of a first memory bit in a first configuration memory frame in the plurality of configuration memory frames, wherein the address of the first memory bit and the size the single configuration memory frame are constants that are stored in the controller circuitry;
   determining an address of a last memory bit in the erroneous memory frame based at least on the address of the leading memory bit in the erroneous memory frame; and
   correcting the erroneous memory frame by loading the read data portion into the erroneous memory frame during normal operation of the integrated circuit, wherein loading the read data portion into the erroneous memory frame comprises updating the leading and last memory bits in the erroneous memory frame and each memory bit between the leading and last memory bits in the erroneous memory frame without affecting other configuration memory frames of the plurality of configuration memory frames.

2. The method defined in claim 1, wherein the read data portion resides in an encrypted memory frame in the off-chip memory module, wherein the off-chip memory module comprises a header frame that includes address mapping information for mapping the frame address of the erroneous memory frame to a frame address of the encrypted memory frame, and wherein reading the portion of data stored in the off-chip memory module comprises:
   reading the header frame from the off-chip memory module to obtain the frame address of the encrypted memory frame prior to reading the portion of data in the off-chip memory module.

3. The method defined in claim 1, wherein loading the read data portion into the erroneous memory frame comprises:
   with the controller circuitry, generating an instruction for writing to the erroneous memory frame.

4. The method defined in claim 1, wherein the integrated circuit comprises a programmable logic device that is configured to implement a user design, the method further comprising:
   determining whether the erroneous memory frame is associated with the user design with the controller circuitry; wherein the erroneous memory frame is corrected by loading the read data portion into the erroneous memory frame when the erroneous memory frame is associated with the user design, wherein the user design is updated when the read data portion is loaded into the erroneous memory frame, and wherein content of the erroneous memory frame is ignored when the erroneous memory frame is not associated with the user design.

5. A method of operating an integrated circuit comprising:
   with error detection circuitry, generating an error message when an error is detected in at least one memory frame in a plurality of memory frames on the integrated circuit, wherein the integrated circuit includes controller circuitry directly coupled to the memory module via a memory interface;
   with the controller circuitry, identifying a frame address of the at least one memory frame from the error message;
   with the controller circuitry, reading memory content from a selected memory frame in a memory module that is external to the integrated circuit based on the identified frame address;
   with the controller circuitry, generating a frame-based bitstream instruction based on the memory content read from the selected memory frame in the memory module and based on the identified frame address; and
   with the controller circuitry, configuring the integrated circuit with the frame-based bitstream instruction during normal operation of the integrated circuit.

6. The method defined in claim 5, wherein configuring the integrated circuit comprises:
   correcting the at least one memory frame in the integrated circuit by loading the memory content read from the selected memory frame in the memory module into the at least one memory frame.

7. The method defined in claim 6, wherein the integrated circuit comprises a field programmable gate array (FPGA) device that is configured with a user design, the method further comprising:
   determining whether the detected error is associated with the user design, wherein the selected memory frame is corrected by loading the memory content read from the selected memory frame when the detected error is associated with the user design, and wherein the selected memory frame is not corrected when the detected error is not associated with the user design.

8. The method defined in claim 6 further comprising:
   determining an address of a first memory bit in the at least one memory frame; and
   determining an address of a last memory bit in the at least one memory frame based at least on the address of the first memory bit, wherein loading the memory content of the selected memory frame in the memory module comprises updating the first and last memory bits and each memory bit between the first and last memory bits.

9. The method defined in claim 8,
   wherein the memory module comprises a plurality of configuration memory frames organized in rows, wherein the plurality of memory frames on the integrated circuit corresponds to respective rows of configuration memory frames in the memory module, and wherein determining the address of the first memory bit in the at least one memory frame comprises:
   calculating the address of the first memory bit in the at least one memory frame based at least on an address of a first memory bit of a first configuration memory frame in the plurality of configuration memory frames and the frame address identified from the error message.

10. The method defined in claim 5, wherein generating the frame-based bitstream instruction based on the memory content read from the selected memory frame in the memory module and based on the identified frame address comprises:
with the controller circuitry, generating the frame-based bitstream instruction based on the memory content read from the selected memory frame in the memory module and based on the identified frame address prior to configuring the integrated circuit.

11. The method defined in claim 5, wherein the memory module comprises a header frame and a plurality of encrypted configuration memory frames, and wherein the selected memory frame comprises an encrypted configuration memory frame in the plurality of encrypted configuration memory frames, the method further comprising:
reading mapping information in the header frame to obtain a mapped frame address of the encrypted configuration memory frame based on the frame address prior to reading the memory content from the selected memory frame.

12. An integrated circuit having an on-chip memory with a plurality of memory frames, the integrated circuit comprising:
error detection circuitry that checks the plurality of memory frames in the on-chip memory for errors, wherein the error detection circuitry generates an error message in response to detecting an error in an erroneous memory frame in the plurality of memory frames;
controller circuitry in the integrated circuit that receives the error message from the error detection circuitry and reads data from a selected memory frame in an off-chip memory module based on the error message, wherein the controller circuitry is directly coupled to the off-chip memory module, and wherein the controller circuitry updates content of the erroneous memory frame by generating a frame-based bitstream instruction based on the data read from the selected memory frame in the off-chip memory module during normal operation of the integrated circuit.

13. The integrated circuit defined in claim 12, wherein a portion of the plurality of memory frames is used to configure the on-chip memory as the controller circuitry.

14. The integrated circuit defined in claim 12, wherein the integrated circuit is configured with a user design, wherein the controller circuitry determines whether the erroneous memory frame comprises a sensitive memory frame that is associated with the user design, and wherein the controller circuitry updates the content of the erroneous memory frame when the erroneous memory frame comprises the sensitive memory frame.

15. The integrated circuit defined in claim 14, wherein the content of the erroneous memory frame remains unchanged when the erroneous memory frame comprises an insensitive memory frame.

16. The integrated circuit defined in claim 12, wherein the off-chip memory module comprises a plurality of configuration memory frames organized in rows, and wherein the plurality of memory frames in the on-chip memory corresponds to respective rows of configuration memory frames in the off-chip memory module.

17. The integrated circuit defined in claim 16, wherein the error message includes a frame address of the erroneous memory frame, and wherein the controller circuitry reads the data from the selected memory frame in the off-chip memory module based on the frame address.

18. The integrated circuit defined in claim 12, wherein each memory frame in the plurality of memory frames in the on-chip memory comprises a plurality of memory bits, and wherein the controller circuitry updates each memory bit in the erroneous memory frame.

* * * * *